Figure 1:
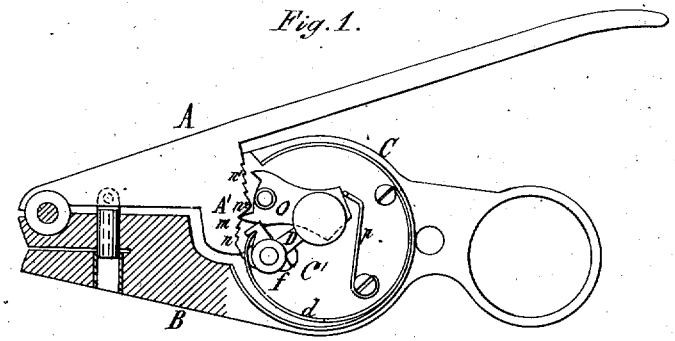

J. CORBETT.

Pawl and Ratchet Mechanisms.

No. 6,146. Reissued Nov. 24, 1874.

J. J. Burner
Edward Wilhelm } Witnesses

Joseph Corbett Inventor
by Jas. Hyatt Atty.

UNITED STATES PATENT OFFICE.

JOSEPH CORBETT, OF HARTFORD, CONN., ASSIGNOR TO THE RAILWAY-REGISTER MANUFACTURING COMPANY, OF BUFFALO, N. Y.

IMPROVEMENT IN PAWL-AND-RATCHET MECHANISMS.

Specification forming part of Letters Patent No. 152,081, dated June 16, 1874; reissue No. 6,146, dated November 24, 1874; application filed October 20, 1874.

DIVISION B.

*To all whom it may concern:*

Be it known that I, JOSEPH CORBETT, of the city and county of Hartford, in the State of Connecticut, have invented certain Improvements in Ratchet-and-Pawl Mechanism, of which the following is a specification:

The invention which forms the subject-matter of this application relates to a certain device or mechanical movement by which a bar or other reciprocating part is compelled to fully complete its movement in one direction before it can be reversed. This device consists of a spring-detent pawl and one or two series of ratchets, with an intermediate shifting-cam, the pawl engaging with one series of ratchets to prevent the reversal of the movement until the latter is fully completed, when the position of the pawl is changed by the shifting-cam, which allows the part to reverse, the pawl now engaging with the other series of ratchets until the reverse movement is completed, when it is again shifted to its former position.

The device is shown in the drawings as applied to a registering-and-alarm ticket-punch, such as is described in Letters Patent No. 111,392, granted to James H. Small January 31, 1871, and is employed to prevent the alarm being sounded without operating the register, as has sometimes been accomplished by partly closing the handles and raising the bell-hammer to such a degree that, by suddenly allowing the handles to spring open, the bell will be rung, while this movement of the handles is insufficient to move the register. As the special adaptation of my mechanical movement to such ticket-punch forms the subject-matter of a separate application, the construction and operation of the punch will not be described in this specification, except so far as it is necessary to show the operation and illustrate the utility of my mechanical movement.

Figure 2:
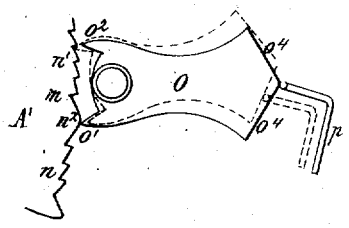
Figure 3:
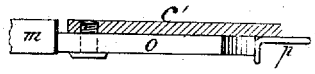

In the accompanying drawings, Figure 1 is a partly-sectional side elevation of a ticket-punch provided with my improvements. Fig. 2 is a detached view, on an enlarged scale, of my improved mechanical movement. Fig. 3 is a top-plan view thereof.

Like letters of reference designate like parts in each of the figures.

A is the upper and B the lower handle of the ticket-punch hinged together. C is the case containing the bell-and-register mechanism on opposite sides of the partition $c'$ thereof. D is the arm of the bell-hammer, pivoted to the partition $c'$, and held in a closed position by a curved flat spring, $d$. $f$ is a cam by which the bell-hammer is raised. The upper handle A of the punch is provided with a downwardly-projecting portion, A′, which connects with the alarm-and-register mechanism, so as to operate the same at the proper time. $m$ is a ratchet-bar formed with the portion A′. It is provided with two series of ratchets, $n\,n^1$, inclined in opposite directions, and an intermediate projecting tooth or cam, $n^2$. $o$ is the reversible detent-pawl, pivoted to the partition $c'$ of the case C, and provided at one end with two teeth, $o^1\,o^2$, designed to engage, respectively, with the ratchets $n\,n^1$. The opposite end of the pawl $o$ is constructed with two inclined sides or planes, $o^4$, as clearly shown in Figs. 1 and 2, against which the spring $p$ alternately presses according to the respective position of the pawl.

The punch being in the position shown in Fig. 1, with the handles distended, the spring $p$, bearing against the upper incline of the detent-pawl $o$, holds the lower tooth $o^1$ of the latter against the lower and upwardly-inclined ratchet $n$.

In closing the handles, in operating the punch, the detent-pawl $o$ slides over the said ratchets until it comes in contact with the cam-tooth $n^2$, which turns the pawl $o$ on its pivot until the spring $p$, which has pressed against the upper inclined side of the pawl, passes the apex thereof, and engages against the lower incline, when the pawl $o$ is shifted so as to engage its upper tooth $o^2$ with the upper series of ratchets $n^1$, as clearly shown in dotted lines, Fig. 2. During the closing movement of the handles, the detent-pawl $o$, being in contact with the lower sides of ratchets $n$, prevents any retrograde movement of the handles until after the closing movement is nearly completed, and the register moved one degree, when the pawl $o$ is shifted, as above described, so as to clear the lower ratchets $n$.

In opening the handles the pawl $o$ slides over the upper series of ratchets $n^1$, and prevents, in a similar manner, the closing of the same until the handles are almost completely opened.

By thus compelling the completion of both the closing and opening movements of the handles before they can be reversed, it is rendered impossible to ring the bell without operating the register.

I do not in this specification intend to confine my improvement to any particular machine.

What I claim as my invention and new mechanical movement is—

1. The combination of the bar $m$, provided with a series of ratchets and shifting-cam, $n^2$, of the spring detent-pawl $o$, whereby the movement of the ratchet-bar in one direction must be completed before its movement can be reversed, substantially as hereinbefore set forth.

2. The combination of the ratchets $n$ $n^1$, intermediate shifting-cam $n^2$, and reversible spring-detent pawl $o$, whereby the movement of the ratchet-bar in either direction must be completed before its movement can be reversed, substantially as hereinbefore set forth.

3. The combination, with the two series of ratchets and intermediate shifting-cam, of the reversible detent-pawl $o$, provided at one end with the inclines $o^4$ of the spring $p$ for holding the pawl in either position, substantially as hereinbefore set forth.

JOSEPH CORBETT.

Witnesses:

A. N. HATHEWAY,

W. L. EATON.